Oct. 24, 1944.  H. C. BERRY  2,361,079
BOX
Filed Aug. 30, 1943
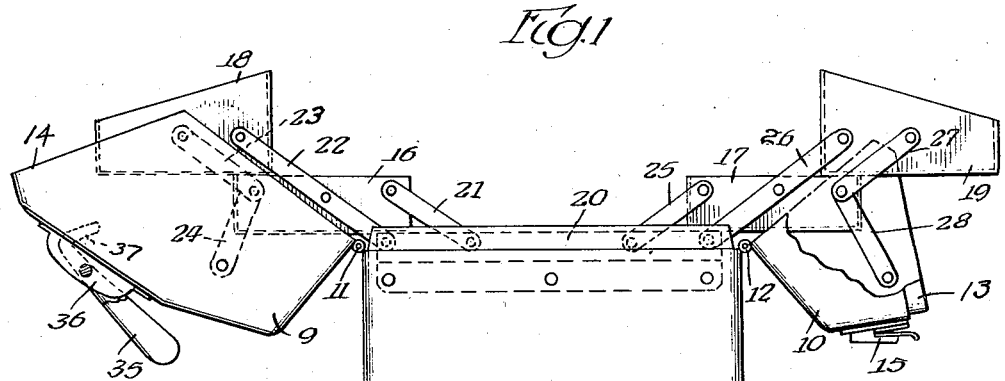
Fig.1
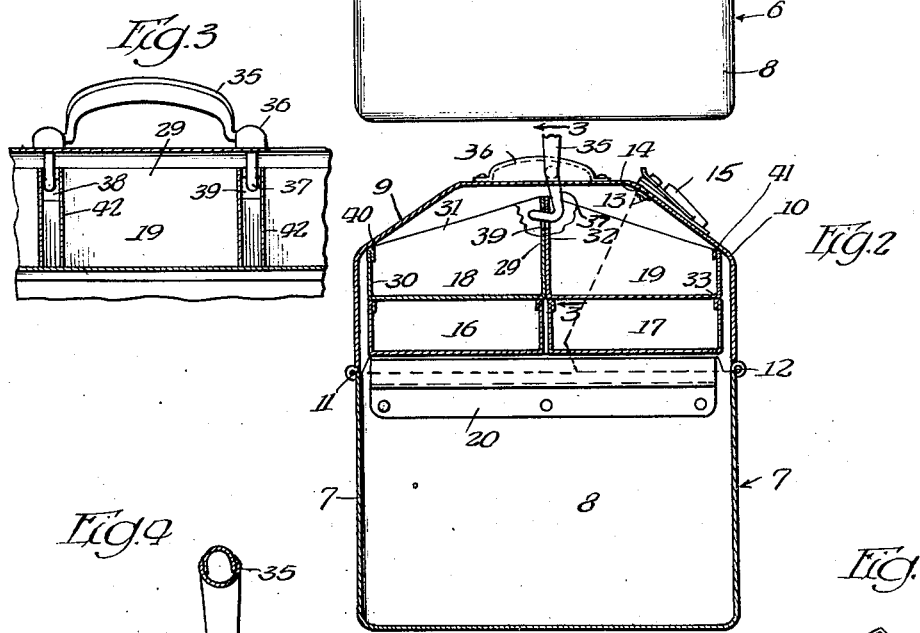
Fig.3
Fig.2
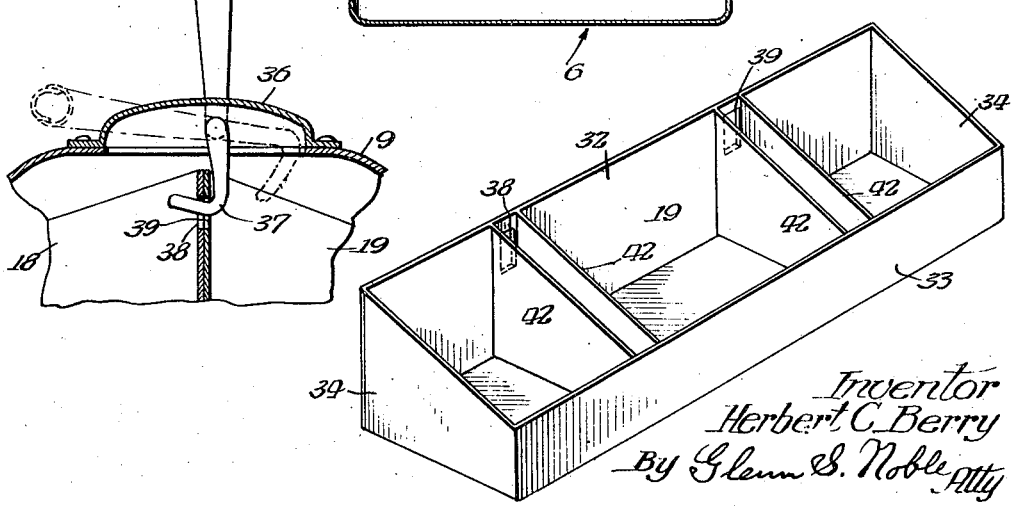
Fig.4
Fig.5
Inventor
Herbert C. Berry
By Glenn S. Noble Atty Patented Oct. 24, 1944

2,361,079

UNITED STATES PATENT OFFICE 2,361,079

BOX

Herbert C. Berry, Chicago, Ill.

Application August 30, 1943, Serial No. 500,506

6 Claims. (Cl. 206—16)

This invention relates to boxes or carrying cases such as commonly used for tools, fishing tackle, or for other purposes. Various types or forms of boxes for such purposes are in more or less general use, and the present invention is directed particularly to certain locking or fastening means actuated by the handle and adapted to interlock various parts or members of the box.

The objects of this invention are to provide an improved box of the type having link supported extensible trays coacting with the cover members; to provide a metallic box or carrier having movable trays and hinged cover members and a handle pivotally mounted on one of said cover members, with means actuated by the handle for fastening the trays together, and in coacting relation with the cover members when the handle is in raised position and releasing said members when the handle is in lowered position; to provide a box having a plurality of pairs of link mounted trays with means actuated by the handle for locking certain of the trays together when the handle is in predetermined position; and to provide such further novel features and improvements as will be described more fully hereinafter.

In the accompanying drawing illustrating this invention,

Fig. 1 is an end view with the covers in open position and the several trays actuated by the cover members in extended positions;

Fig. 2 is a vertical cross sectional view showing the parts in closed position with the handle raised;

Fig. 3 is a sectional detail taken substantially on the line 3—3 of Fig. 2;

Fig. 4 is an enlarged sectional detail showing the hooks or means actuated by the handle in engaging position with the upper trays; and Fig. 5 is a perspective view of one of the upper trays.

My improved box is of more or less conventional construction having a body 6 with sides 7 and ends 8. The cover comprises two sections 9 and 10 formed as shown in the drawing. The cover section 9 is hinged at 11 to the upper edge of one of the sides 7 and extends upwardly and then across the top terminating at a short distance beyond the central plane of the box. The cover section 10 is hinged to the box at 12, and its free boundary or edge 13 underlies the corresponding boundary or edge 14 of the section 9 so that such overlapping portion 14 serves to make a tight closure around the meeting edges and also serves to hold the section 10 in closed position. The cover sections may be fastened together by any suitable fastening device or locks such as indicated at 15.

The box or case may be provided with any desired number of trays, but I have shown four trays 16, 17, 18 and 19 which are movably mounted in the box and adapted to be extended or opened with the cover sections. The combined width of the two trays 16 and 17 is substantially the same as the width of the box and the center walls of the trays meet at substantially the center of the box. These trays rest upon angle bars or Z bars 20 secured to the end walls of the box. Suitable linkage is provided for actuating the several trays by means of the cover sections and moving them from normal closed to extended positions. The trays 16 and 18 are provided with links 21 and 22 which are pivotally connected to the bars 20. They are also provided with links 23 for maintaining parallel relation during the swinging movement. The tray 18 is connected to the cover 9 by an actuating link 24. The trays 17 and 19 are likewise provided with connecting links 25, 26 and 27, and actuating links 28 as shown. It will be readily seen that by means of such linkage, the trays will be swung or extended from closed position as shown in Fig. 2 to full open position as shown in Fig. 1 when the cover sections are swung outwardly.

The trays 18 and 19 are substantially duplicates and are made in the novel form shown particularly in Fig. 5. The center wall or inner side 29 of the tray 18 extends up a substantial distance beyond the outer wall 30 so that the tray is trapezoidal shaped in cross section. The ends 31 slope upwardly, the arrangement being such that the center wall closely approaches the cover and the capacity of the tray is substantially increased over that of an ordinary rectangular tray. The inner wall or side 32 of the tray 19 also extends upwardly to match the side 29 and is taller than the outer side or wall 33. The ends 34 are also tapered or beveled upwardly as shown.

The cover section 9 has a handle 35 for carrying the box which is pivoted at the ends in channel shape bearing members 36 which are riveted or otherwise secured to the cover. The ends of the handle 35 are provided with hooks or catches 37 which extend downwardly and inwardly through slots in the cover. These hooks are positioned at substantially right angles to the handle and their lower extremities or hook portions are adapted to pass through holes 38 and 39 in the inner walls of the trays 18 and 19 as best shown in Fig. 4. When the handle 35 is in raised position, the hooks 37 are engaged with the trays and tend to fasten or hold the cover and trays together whereby the box may be raised with all of the parts in normal closed position. This prevents the possible undesired opening of the cover sections when the handle is lifted with the possibility of tipping over the box and spilling the contents thereof which would otherwise be apt to occur. The interlocking of the trays with the box is further effected by having the upper edges of the outer sides of the trays 18 and 19 contacting or engaging with the covers as indicated at 40 and 41.

When the box is to be opened, the handle 35 is swung to the dotted position shown in Fig. 4 which withdraws the hooks from engagement with the trays and permits the cover sections to be opened in the ordinary manner.

I have found that with such improved interlocking devices or catches, there is some possibility of tools or parts in the upper trays covering up the holes 38 and 39 or coming within the paths of the hooks so that they will not readily engage with the trays. In order to avoid this, I provide guards adjacent to the holes to prevent any such articles or obstructions from coming within the paths of the hooks. These guards preferably comprise partition members 42 in the upper trays which are positioned on each side of the holes and closely thereto as shown in Fig. 5 to prevent tools, or the like, from lodging close to or covering the holes and preventing the engagement of the hooks as above suggested. These partitions also serve to strengthen the trays and to divide the same into sections which are desirable for small articles.

From this description, it will be readily seen that I provide means adapted to be actuated by the box handle for fastening the covers and trays together, particularly where a plurality of sets of extensible trays are incorporated in the construction.

While I have shown a preferred form of my invention, it is apparent that modifications may be made which will come within the scope thereof and therefore I do not wish to be limited to the particular construction shown and described except as set forth in the following claims in which I claim:

1. A box for tools, or the like, comprising a substantially rectangular body portion, cover sections hinged to the upper edges of the sides of the box, one of said sections extending upwardly and inwardly beyond the central plane of the box and overlapping the meeting edge of the other section, said sections enclosing an additional space above the top of the box, a plurality of sets of trays mounted in said space on opposite sides of the median line of the box, the inner sides of the opposed trays lying closely against each other, linkage connecting the respective sets of trays with the box and with the adjacent cover sections, whereby the trays may be swung to extended positions by the movement of the cover sections, a handle pivotally mounted on the first named cover section, having hooks projecting into the box which engage with the inner sides of the topmost trays to fasten the parts together when the handle is in raised position and which are freed from said sides when the handle is swung to predetermined position.

2. A tool box of the type described having a body portion and a cover comprising two sections, a handle pivoted to the top of the cover and having hooks extending inwardly through the cover, sets of trays mounted in the box on either side of the median line and having linkage connecting the sets with the respective cover sections to move the sets to extended positions, the adjacent sides of the upper trays having holes which are engaged by the hooks when the handle is in raised position, the outer edges of the uppermost trays engaging with the respective adjacent cover sections whereby the trays and cover sections will be locked together when the hooks are in engagement with said trays.

3. A box or chest comprising a body portion, a cover member hinged to one side of the body portion and extending upwardly and inwardly at least part way across the top of the box, a handle pivotally mounted in bearings secured to the top of the cover, extensions on said handle which project inwardly through slots in the cover, a plurality of trays mounted in the box, links connecting said trays with the box and with one of the cover sections, the uppermost tray having holes which are engaged by said extensions to fasten the cover and tray together, said extensions being formed to release the tray when the handle is swung to inoperative position.

4. The combination with a box having a body portion with cover sections hingedly connected to the body portion and having a plurality of laterally disposed series of superposed trays mounted in the box and having links secured to each series of trays and to the adjacent cover section whereby a series of trays may be moved into outwardly extending position upon the opening of the respective cover section, a handle pivotally mounted on one of the cover sections and having a hook extending inwardly through the cover and adapted to engage with holes in adjacent walls of the topmost trays when the handle is in raised position and to disengage said holes when in lowered position.

5. In a device of the character set forth, the combination of a substantially rectangular box, covers hinged to the side walls of the box, a pair of laterally disposed trays mounted in the top of the box, linkage connecting the respective trays and box and connecting each of said trays to one of the covers, a handle pivotally mounted on one of the covers and having a hook extending inwardly therethrough and adapted to engage with holes in the adjacent walls of the trays when in raised position whereby the cover and trays will all be fastened together, said hook releasing the trays when the handle is in lowered position.

6. A tray for the purposes set forth, having one wall provided with a hole adapted to be engaged by a fastening device and having partitions positioned adjacent to the hole and extending upwardly to approximately the top of the same and serving to prevent articles placed in the tray from coming within the path of the fastening means.

HERBERT C. BERRY.